US008570921B2

(12) United States Patent
Blancha et al.

(10) Patent No.: US 8,570,921 B2
(45) Date of Patent: Oct. 29, 2013

(54) APPARATUS FOR AND METHOD OF GENERATING A TIME REFERENCE

(75) Inventors: Barry Edward Blancha, Boxborough, MA (US); William F. Kappauf, Bend, OR (US); John David Unger, Windham, NH (US)

(73) Assignee: Bin1 Ate, LLC, Boxborough, MA (US)

( * ) Notice: Subject to any disclaimer, the term of this patent is extended or adjusted under 35 U.S.C. 154(b) by 807 days.

(21) Appl. No.: 12/661,175

(22) Filed: Mar. 11, 2010

(65) Prior Publication Data

US 2011/0022872 A1 Jan. 27, 2011

Related U.S. Application Data

(62) Division of application No. 11/775,565, filed on Jul. 10, 2007, now Pat. No. 7,710,981.

(60) Provisional application No. 60/819,780, filed on Jul. 10, 2006.

(51) Int. Cl.
*H04L 13/10* (2006.01)
(52) U.S. Cl.
USPC .......................................... 370/304; 370/324
(58) Field of Classification Search
USPC ................... 370/324, 350, 252, 304
See application file for complete search history.

(56) References Cited

U.S. PATENT DOCUMENTS

| 5,717,704 | A | 2/1998 | Rosenfeld |
| 5,875,402 | A * | 2/1999 | Yamawaki ..................... 455/502 |
| 6,060,898 | A | 5/2000 | Arkin |
| 6,483,825 | B2 * | 11/2002 | Seta .............................. 370/335 |
| 6,836,747 | B2 * | 12/2004 | Suzuki .......................... 702/178 |
| 7,525,922 | B2 | 4/2009 | Cidon et al. |
| 2005/0071703 | A1 | 3/2005 | Lee et al. |
| 2006/0123296 | A1 | 6/2006 | Reichert |

OTHER PUBLICATIONS

International Search Report from corresponding PCT Application No. PCT/US2007/073140 Nov. 15, 2007.

* cited by examiner

*Primary Examiner* — Brenda H Pham
(74) *Attorney, Agent, or Firm* — Lando & Anastasi, LLP

(57) ABSTRACT

In one embodiment, a system is configured to generate a time reference where the system includes a bi-directional loop configured to have a first propagation speed in a first direction and a second propagation speed in a second direction, wherein the first propagation speed is substantially equal to the second propagation speed. In one embodiment, the system further includes a plurality of system elements coupled to the bi-directional loop, wherein each respective system element of the plurality of system elements is configured to determine a time reference common to each as an average arrival time at the respective system element of a first signal transmitted in the first direction over the bi-directional loop and a second signal transmitted in the second direction over the bi-directional loop.

21 Claims, 7 Drawing Sheets

APPARATUS FOR AND METHOD OF GENERATING A TIME REFERENCE

RELATED APPLICATIONS

This application is a divisional of, and claims priority under 35 U.S.C. §120 and §121 to co-pending U.S. patent application Ser. No. 11/775,565 entitled "Apparatus for and Method of Generating a Time Reference," filed on Jul. 10, 2007, and which claims the benefit under 35 U.S.C. §119(e) to U.S. provisional patent application. Ser. No. 60/819,780 entitled "Apparatus for and Method of Generating a Time Reference," filed Jul. 10, 2006, each of which is hereby incorporated by reference in its entirety.

BACKGROUND OF INVENTION

1. Field of Invention

Embodiments of the invention relate generally to apparatus and methods of generating a time reference. In particular, one embodiment of the invention relates to establishing a time reference for use in a test system.

2. Discussion of Related Art

Time references are employed in a wide variety of systems to provide a reference from which events may be generated and measured. Some examples of systems that employ time references include test systems, computer systems, control systems and distributed systems generally where the distributed system may need to synchronize functions across some distance (e.g., for data collection). Often, computers and other electronic systems distribute a clock signal to various system elements to provide a common time reference. Further, in synchronous systems a synchronous clock is employed as a time reference. For such systems to be effective, the clock must be received at the same time at each of the system elements which employ the clock signal. In practice, however, propagation delays inherent in the transmission medium that is employed (e.g., electrical conductors, optical fibers, etc.) make it difficult to achieve the preceding objective. Further, the propagation delays become an increasing problem for applications that require the measurement and/or timing of relatively fast signals and events (e.g., where events are measured in nanoseconds, picoseconds, etc). That is, ever smaller differences or changes in the transmission time of signals can have a significant impact on system accuracy and performance as measurement speeds increase.

Automatic Test Equipment ("ATE") that is used to test electronics including electronic circuitry, devices, etc. provides one example where a high degree of precision is required when triggering and measuring the occurrence of events in the system. For example, ATE is often used to test the operation of semiconductors. Generally, during the course of such testing one or more known test signals are applied to stimulate the electronics while one or more measurements are recorded concerning the performance and/or response of the electronics to the test signals at various points in time. The testing of modern circuitry which can operate at very high speeds requires a high degree of resolution and speed in capturing the timing of events, e.g., time measurements in nanoseconds are often required.

Often, the electronics that are undergoing test are connected to one or more instruments included in the ATE system. The instruments may provide a set of connections by which test signals may be applied to an electronics device under test ("DUT") and response signals may be received from the DUT. An ATE includes multiple signal paths that interconnect the DUT to the various instruments and system controllers. In addition, multiple signal paths also exist between the various instruments. Often, the signal paths between different instruments are routed through a central controller or other device. These signal paths may be of varying lengths.

The plurality of different signal path lengths may effect the accuracy of test measurements because the latency of transmittal signals will vary depending upon the length of the signal path. This problem, is particularly relevant in ATE because of the high resolution of the timing measurements and their relevance to one another.

To date, a variety of approaches have been attempted to reduce or eliminate errors created by signal latency described above. These approaches generally attempt to carefully control and distribute a clock signal throughout the ATE system. Some approaches attempt to do so by more precisely controlling the length of the communication paths. For example, where the ATE includes a plurality of instruments that are connected to a control unit via cables, the length of the cables can be controlled to provide precisely matching cable lengths in an effort to equalize any latency caused as a result of the communication paths. Attempts have also been made to equalize the length of solder traces in systems that employ traces. These approaches, however, may increase system costs significantly, for example, by substantially increasing the cost of the signal cabling and/or associated labor.

Other approaches have attempted to adjust the propagation delay during ATE operation in an attempt to have multiple signals arrive at their destinations at the same time. However, these systems may suffer from too much error. Further, some systems that attempt to control propagation delay do so in a manner that limits the maximum propagation delay that may be compensated for.

Still another approach includes an application specific integrated circuit (ASIC) at each instrument and employs each ASIC to provide a timing reference at each instrument. Sometimes referred to as distributed pattern control, such an approach results in ATE that is more expensive and requires system-wide calibration to confirm that the timing references provided by the various ASICs are synchronized.

In addition, some of the preceding approaches require special fixtures to calibrate the system components to a common time reference, and as a result, require that test heads be undocked to perform such a calibration.

SUMMARY OF THE INVENTION

Aspects of the invention provide a system and method for establishing a common system-wide time reference that can, in various embodiments, be independently determined by a plurality of system elements. The approaches described herein are widely applicable and may, for example, be employed in ATE, computers and systems that include distributed system elements including system elements that are geographically distributed from one another. Further, the system elements can employ the time reference to measure, coordinate and sequence the generation and receipt of system events to a high degree of precision. According to one embodiment, the system can achieve a measurement accuracy of at least ±100 picoseconds. In one embodiment, measurement accuracy is within ±30 picoseconds, for example, in a single rack of instruments connected to a time reference loop. In one embodiment, the system is scalable and may include a plurality of sets of system elements where the system elements from each of the sets can be referenced to the system-wide time reference to measure events.

Prior approaches fail to recognize that reliance on a time reference that is first generated and then distributed to system elements contributes to many of the problems that such prior systems attempt to overcome, e.g., unmatched propagation delays. In contrast, embodiments of the invention distribute two or more signals that are employed by the system elements to generate the time reference using the signals as received by the system element. Accordingly, embodiments of the invention provide for a time reference that can be employed in synchronizing events at a plurality of distributed system elements. Further, in some embodiments, the distributed manner in which the common-time reference can be determined by the system elements reduces both the system's cost and complexity. For example, various embodiments can reduce the cost of the transmission medium over which signals are transmitted in the system. That is, some embodiments make it unnecessary that cables of precisely matching lengths and/or matching impedances be employed for some signal paths. Further, the distributed manner in which the time reference can be generated may reduce the cost and complexity of system calibrations because various calibration steps can be performed independently at the system elements.

Embodiments of the invention provide a timing reference for ATE. Further, in various embodiments, the invention provides a time reference using a bi-directional time reference bus and time measurement units included in a synchronizer and one or more instruments located in a test head where the time reference is common to the synchronizer and one or more of the instruments. In one embodiment, the time reference can be employed to measure and compensate for delays in signal transmission caused by the varying length of different signal paths. In one embodiment, calibration of the time reference at the instruments can be accomplished in a distributed manner that does not require that the test head be undocked.

According to one aspect of the invention, a method of generating a common time reference is provided for a system including a plurality of system elements which are coupled to a time reference loop. According to one embodiment, the method includes acts of: determining, for each respective system element of the plurality of system elements, a time interval of a first signal transmitted to the respective system element in a first direction over the time reference loop; determining, for each respective system element of the plurality of system elements, a time of arrival of a second signal transmitted to the respective system element in a second direction over the time reference loop, wherein the second direction is opposite the first direction; determining, for each respective system element of the plurality of system elements, an average time of arrival based on the time of arrival of the first signal at the respective system element and the time of arrival of the second signal at the respective system element; and employing for each of the plurality of system elements, the average time of arrival determined for the respective system element as the common time reference for the respective system element.

In further embodiment, the method includes an act of determining, at a first system element a time of an event in the system by measuring a time interval between a detection of a signal indicative of the event at the first system element and the common time reference. In yet a further embodiment, the method includes an act of adjusting, at the first system element, a measured time of the event to account for a propagation delay of the signal transmitted to the first system element. In still a further embodiment, the method includes an act of determining, at a second system element, the time of the event in the system by measuring a time interval between a detection of the signal indicative of the event at the second system element and the common time reference. In yet another embodiment, the method further includes acts of adjusting a first measured time of the event, at the first system element, to account for a propagation delay of the signal transmitted to the first system element, and adjusting a second measured time of the event, at the second system element, to account for a propagation delay of the signal transmitted to the second system element.

In another aspect, the invention provides a system configured to generate a time reference where the system includes a bi-directional loop configured to have a first propagation speed in a first direction and a second propagation speed in a second direction, wherein the first propagation speed is substantially equal to the second propagation speed. In one embodiment, the system further includes a plurality of system elements coupled to the bi-directional loop, wherein each respective system element of the plurality of system elements is configured to determine a time reference common to each as an average arrival time at the respective system element of a first signal transmitted in the first direction over the bi-directional loop and a second signal transmitted in the second direction over the bi-directional loop. According to one embodiment, the bi-directional loop includes a bi-directional differential bus. In yet another embodiment, the system includes automatic test equipment and the plurality of system elements including a plurality of instruments. In a version of this embodiment, the plurality of system elements includes a synchronizer and the plurality of system elements are configured to employ the time reference for a synchronous operation of test equipment.

In yet another aspect, an automatic test system includes a synchronizer configured to measure signals corresponding to system events relative to a time reference, a plurality of system elements in electrical communication with the synchronizer where the plurality of system elements include a first instrument and a second instrument, a first trigger bus configured to couple to the synchronizer and the first instrument where the first trigger bus includes a first propagation delay and the second trigger bus configured to couple to the synchronizer and the second instrument where the second trigger bus includes a second propagation delay that is different than the first propagation delay. In accordance with one embodiment, the time reference is a synchronous time reference employed by each of the first instrument and the second instrument to measure the signals at the respective instruments relative to the time reference. In a further embodiment, the system includes a bi-directional loop coupled to each of the synchronizer, the first instrument and the second instrument. In a version of this embodiment, the bi-directional loop is configured to transmit a plurality of signals employed by each of the synchronizer, the first instrument and the second instrument, to determine the synchronous time reference.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
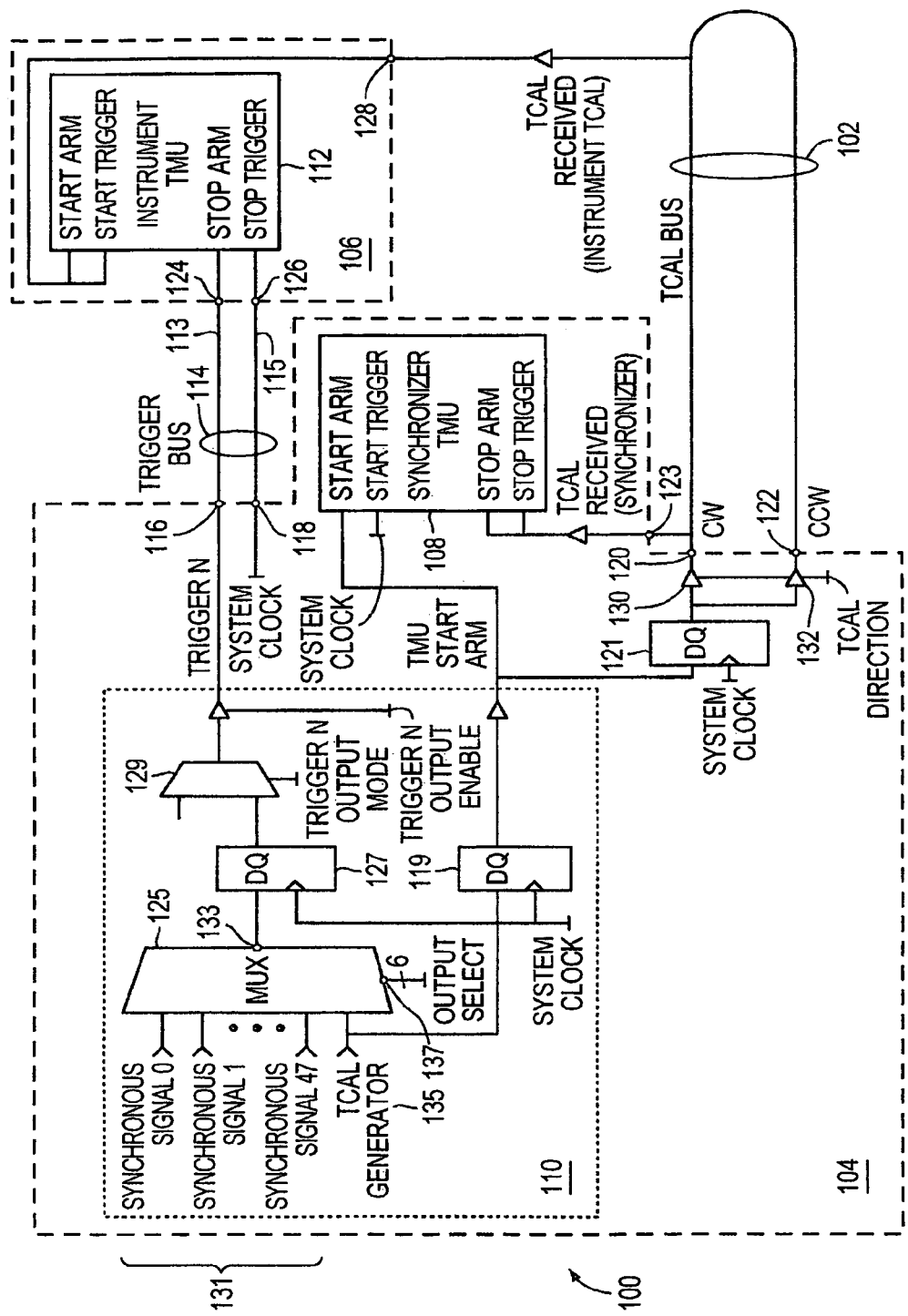
FIG. 1 is a block diagram of a system that includes a time reference bus in accordance with an embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Referring to FIG. 1, a system 100 including a time reference bus 102 is illustrated. In accordance with one embodiment, the system 100 is included in a larger system (e.g., a system of ATE) that may include additional elements. For example, the ATE system may include a single test head or multiple test heads. Further, each test head may include one or more modules such as a power module, one or more instruments racks, a meter calibration module and a synchronizer module. In one embodiment, each instrument rack is capable of holding a plurality of instruments. In one embodiment, the system 100 is employed as part of a system of ATE that tests electronic devices (e.g., boards, semiconductor wafers, etc.) to determine their performance. In general, in this embodiment, a device under test ("DUT") is electrically connected to one or a plurality of instruments and the system 100 applies stimulus (generally in the form of electrical signals) to the DUT and measures the responses of the DUT. In accordance with one embodiment, the instruments communicate with a test controller via a signal backplane, and the power module communicates with the instrument via a power backplane. In a further embodiment, the ATE includes a plurality of signal backplanes. In one embodiment, an I/O concentrator is mounted proximate the signal and the power backplanes and provides a connection between the instrument(s) and the DUT.

In one embodiment, the system 100 includes a plurality of system elements which are connected to the time reference bus 102, for example, a synchronizer 104 and an instrument 106. As is described further herein, the system may include a plurality of time reference busses. For example, a first time reference bus connected to a first set of system elements and a second time reference bus connected to a second set of system elements.

According to one embodiment, the synchronizer 104 provides synchronization signals for the instrument 106. In a further embodiment, the synchronizer 104 may also provide a system clock signal and timing calibration circuitry for the system 100. In a further embodiment, data I/O to a system controller is also included in the synchronizer 104. In various embodiments, the synchronizer 104 may include other signals that can be employed in device testing, for example, the system clock 110.

In accordance with one embodiment, the instrument 106 is a test instrument that can be employed to provide signals to the DUT and measure and/or record signals received from the DUT. Further, the system may include a plurality of instruments that can communicate with one another. In one embodiment, the instruments are boards installed in a rack.

In accordance with one embodiment, the synchronizer 104 includes a synchronizer time measurement unit 108 ("synchronizer TMU") and signal control circuitry 110. In accordance with one embodiment, the signal control circuitry 110 is included in a Field Programmable Gate Array ("FPGA"). In a further embodiment, the instrument 106 includes an instrument TMU 112.

In one embodiment, the system 100 may also include a trigger bus 114 which connects the synchronizer 104 to instrument 106, e.g., connects the instrument TMU 112 to the signal control circuitry 110.

In one embodiment, the trigger bus 114 includes at least one trigger line 113 and a system clock line 115. In a further embodiment, the trigger bus 114 includes a plurality of trigger lines (e.g., 8 independent lines per instrument). For example, the system 100 can include 32 instruments and 32 independent trigger busses each including 8 trigger lines and a system clock line. In another embodiment, the system clock line 115 is not included in the trigger bus 114.

In accordance with one embodiment, the synchronizer 104 includes a trigger I/O 116, a clock output 118, a first time reference output 120, a second time reference output 122 and a timing signal input 123. In one embodiment, each instrument 106 includes a Stop Arm input 124, a Stop Trigger input 126 and a timing signal input 128. As will be apparent to one of ordinary skill, for the purpose of the immediately following description concerning the generation of a common time reference for the system 100, a comprehensive listing of all of the I/O associated with each of the synchronizer 104 and the instrument 106 is unnecessary and therefore is not provided here.

In some embodiments, the synchronizer 104 includes a first flip flop 119, a second flip flop 121, a first multiplexer ("MUX") 125, a third flip flop 127, a second MUX 129, a first buffer 130, and a second buffer 132. In a version of these embodiments, the first flip flop 119, the first MUX 125, the third flip flop 127 and the second MUX 129 are included in an FPGA. Various other hardware configurations may be employed in the synchronizer 104 in other embodiments that include a different arrangement of circuit elements, for example, more of these or other circuit elements, different circuit elements or fewer circuit elements than those described here and illustrated in FIG. 1.

In accordance with one embodiment, the first MUX 125 includes a plurality of inputs 131, an output 133, a time reference generator signal input ("Tcal") 135 and an output select 137. The first MUX 125 can receive a plurality of signals associated with each of the plurality of instruments (e.g., the instrument 106) via the plurality of inputs 131 and supply a signal from any of the inputs to the output 133 based on the value at the output select 137. In one embodiment, the output select 137 may include multiple bits that can be used to provide logic that results in the communication of the signal from a selected one of the plurality of inputs 131 to the output 133.

In one embodiment, the system clock is connected to the clock terminal of each of the first flip flop 119, the second flip flop 121 and the third flip flop 127. Further, the Tcal signal 135 may be connected to the D input of the first flip flop 119.

In yet a further embodiment, the output of the first MUX 133 is connected to the D input of the third flip flop 127 and the Q output of the third flip flop is connected to an input of the second MUX 129. The second MUX 129 may also include a Trigger Output Mode that allows the selection of a specific trigger line selected from among a plurality of trigger lines. In one embodiment, eight trigger lines are included in each trigger bus and the system 100 includes a separate trigger bus for each instrument.

In general, the system 100 employs the time reference bus 102 to provide each instrument with a time reference that is common to other instruments in the system where the time reference can be employed to determine the time of occurrence of events and/or receipt of signals at the instrument relative to the time reference. According to one embodiment, this approach is employed in a system which can operate in an asynchronous mode of operation. Further, the time reference also provides the instrument with a reference from which it can determine transmission delays associated with the instrument relative to other instruments in the ATE (i.e., determine a skew) and adjust the propagation delay of signals that are received by or transmitted from the instrument in a system that can operate in a synchronous mode of operation. In other embodiments, the propagation delays can be adjusted in a system that operates in an asynchronous mode of operation. As is described in greater detail below, the ability to individually adjust each instrument to compensate for system latency independent of the other instruments results in improved calibration methods.

In accordance with one embodiment, the time measurement units 108, 112 are employed to determine the time reference and the timing of trigger signals relative to the time reference at the synchronizer 104 and the instrument 112, respectively.

The time measurement units 108, 112 may be configured using any of a variety of conventional designs known to those of ordinary skill in the art to measure time intervals. In accordance with one embodiment, each TMU includes an FPGA. According to one embodiment, each TMU 108, 112 is connected to the time reference bus 102 one or more trigger signal inputs and the system clock. In a further embodiment, each instrument TMU 112 is connected to a plurality of trigger lines included in a trigger bus 114.

Figure 2A:
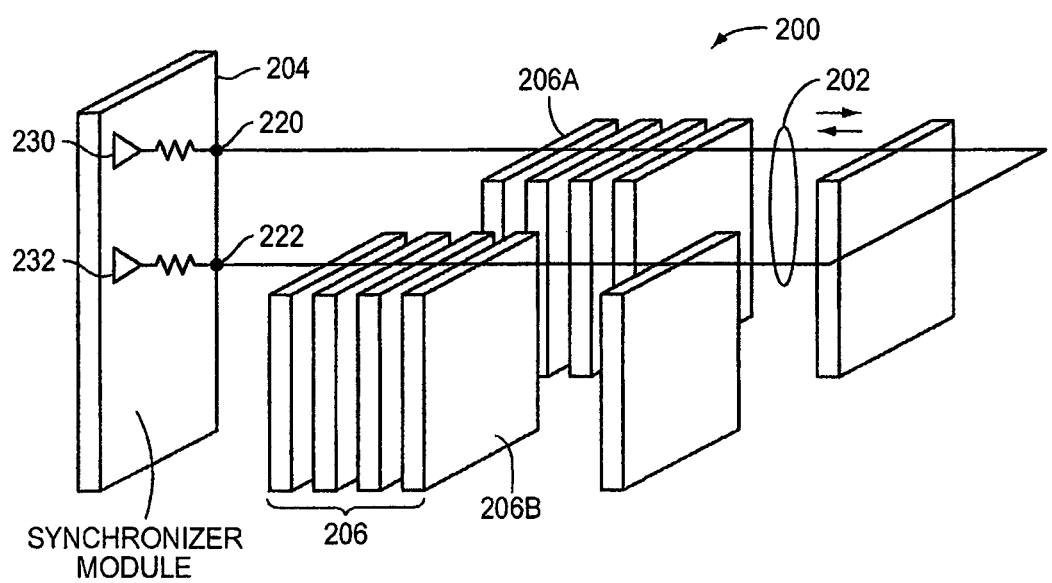
FIG. 2A illustrates a block diagram of a system that includes a time reference bus in accordance with another embodiment.

Referring now to FIG. 2A, in one embodiment, a system 200 includes a synchronizer 204, a plurality of instruments 206, and the time reference bus 202. In a further embodiment, the time reference bus 202 terminates at the synchronizer 204 and connects to each of the plurality of instruments 206. In one embodiment, the synchronizer 204 is connected to the time reference bus 202 at the first time reference output 220, the second time reference output 222. In a version of this embodiment, each of first and second time reference outputs are connected to a buffer 230, 232, respectively, included in the synchronizer 204.

In one embodiment, the time reference bus 202 can provide a bi-directional signal path that loops from the first time reference output 220 sequentially to each of the plurality of instruments 206, i.e., "daisy chains" and returns to the synchronizer 204 at the second time reference output 222. In a further embodiment, the propagation speed of the time reference bus 202 is independent of the direction of propagation along the bus 202.

Generally, a time reference is established by transmitting a first signal (e.g., pulse) over the time reference bus 202 in a first direction (e.g., clockwise), transmitting a second signal (e.g., pulse) over the time reference bus 202 in a second direction (e.g., counterclockwise) and determining the average arrival time of the pulses at the instrument 206. Referring back to FIG. 2A, the buffers 230, 232 may be connected to an enable signal that allows the selection of transmission of a CW pulse, transmission of a CCW pulse, simultaneous transmission of both CW and CCW pulses, or transmission of neither pulse depending upon whether the enable line is on or off for each of the buffers 230, 232, respectively.

According to one embodiment, a test head includes a first plurality of instruments associated with a first signal backplane and a second plurality of instruments associated with a second signal backplane. In one further embodiment, the system 200 of FIG. 2A includes a first time reference bus (e.g., bus 202) and a second time reference bus (e.g., bus 202) each connected to the synchronizer 204 where the first time reference bus is connected to each of the first plurality of instruments and the second time reference bus is connected to each of the second plurality of instruments. That is, various embodiments are scalable such that a plurality of time reference busses may be employed and referred to a common time reference. In an alternate embodiment, the system 200 includes a single time reference bus connected to each of first plurality of instruments and the second plurality of instruments. As is described more fully below, a common time reference may be generated for each of the above embodiments.

Figure 2B:
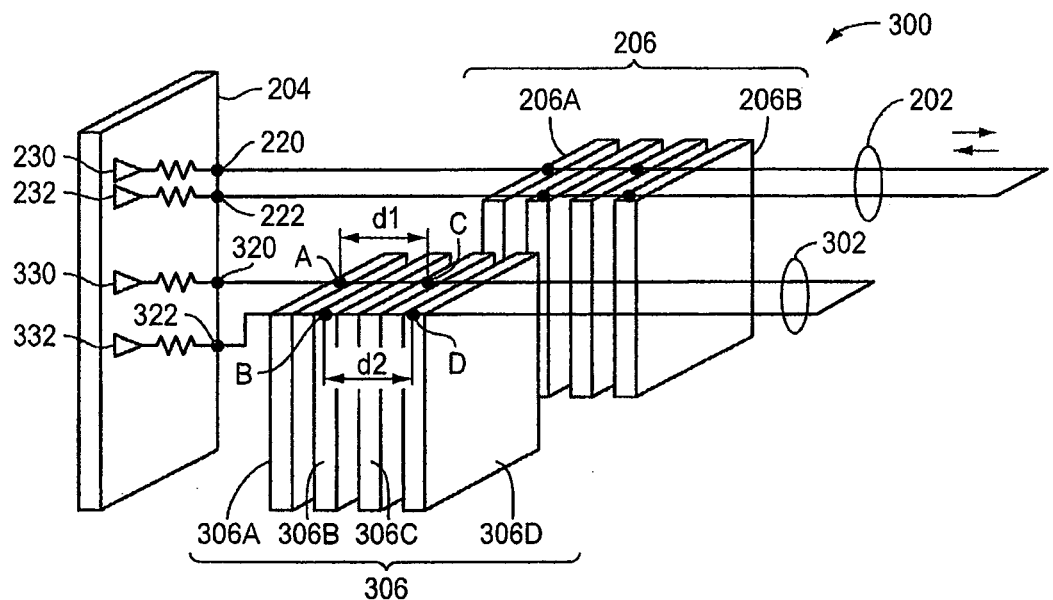
FIG. 2B illustrates a block diagram of a system that includes a plurality of time reference busses in accordance with one embodiment.

For example, FIG. 2B illustrates a system 300 including a first plurality of instruments 206 and a second plurality of instruments 306 where the first plurality of instruments 206 are connected to a first time reference bus 202 and the second plurality of instruments 306 are connected to a second time reference bus 302. In accordance with one embodiment, a common time reference is employed for each of the plurality of instruments 206 and 306.

In the illustrated embodiment, the first time reference bus 202 terminates at the synchronizer 204 and connects to each of the first plurality of instruments 206. In one embodiment, the synchronizer 204 is connected to the time reference bus 202 at the first time reference output 220 and the second time reference output 222. In a version of this embodiment, each of first and second time reference outputs are connected to a buffer 230, 232, respectively, included in the synchronizer 204.

Similarly, the second time reference bus 302 terminates at the synchronizer 204 and connects to each of the second plurality of instruments 306. In one embodiment, the synchronizer 204 is connected to the time reference bus 302 at the third time reference output 320 and the fourth time reference output 322. In a version of this embodiment, each of third and fourth time reference outputs are connected to a buffer 330 and the buffer 332, respectively, included in the synchronizer 204.

In one embodiment, the first time reference bus 202 is selected as a source of common time reference for one or more additional time-reference busses (e.g., for the second time reference bus 302). In accordance with one embodiment, the common time reference is determined based on an average arrival time of a clockwise signal and a counterclockwise signal transmitted over the first time reference bus 202. A time reference is also determined for the second time reference bus 302 based on an average arrival time of a clockwise signal and a counterclockwise signal transmitted over the second time reference bus 302. This time reference for the second time reference bus 302 is common to each of the elements connected to the second time reference bus. In this embodiment, the system 300 refers the time reference for the second time reference bus 302 to a system-wide time reference (i.e., the common time reference established using the first time reference bus 202) by determining a time interval between the time reference for the second time reference bus 302 and the common time reference determined for the first time reference bus 202. As should be apparent to those of ordinary skill in the art, the preceding approach can be employed to establish a common time reference for any quantity of two or more sets of system elements (e.g., instruments) associated with separate time reference busses, respectively. For example, a common time reference established using a first time reference bus can be employed system wide where each additional time reference bus is referred back to the common time reference. Accordingly, events can be measured at any instrument in the system relative to the same time reference.

The degradation of a signal during transmission is a known phenomena. That is, the impedance of a transmission medium can cause a signal to become less well defined as it travels further through the medium. For example, where the signal includes a step change from a LO logic state to a HI logic state, the transition from LO to HI may be marked by a signal with a slope that becomes less and less similar to an ideal step function the further the signal travels from the signal source. This is sometimes referred to as edge-rate degradation.

Accordingly, some embodiments employ measures to address edge-rate degradation to reduce and/or eliminate errors that would otherwise occur in timing measurements. In particular, embodiments employ a bi-directional time reference bus that has the same impedance in each of a first direction and a second direction opposite the first direction. Further, embodiments employ a time reference bus with load impedances distributed equally about the time reference bus. In accordance with these embodiments, a signal that travels clockwise over the time reference bus will experience an edge-rate degradation that substantially matches (but is opposite in direction) to the edge-rate degradation experienced by a signal that travels in the counterclockwise direction over the time reference bus. Thus, the effect of edge-rate degradation in the two directions can cancel each other out when average arrival times are computed. As a result, the average arrival times computed at each of the system elements (and any time references derived therefrom) are accurate relative to each of the other system elements connected to the bus. Thus, the average arrival times provide a useful reference that is the same for all of the system elements that are connected to the time reference bus.

In accordance with one embodiment, a regular and equal distribution of impedance around the time reference bus is employed. Referring again to FIG. 2B, a first instrument 306A is connected to the time reference bus at a point A, a second instrument 306B is connected to the time reference bus at a point B, a third instrument 306C is connected to the time reference bus at a point C and a fourth instrument 306D is connected to the time reference bus at a point D. In accordance with one embodiment, the distance d1 along the time reference bus 302 from the point A to the point C substantially equals the distance d2 along the time reference bus 302 from the point B to the point D. Further, a distance between the point C and the point D (not illustrated) along the time reference bus 302 substantially equals the distances d1 and d2. In accordance with a further embodiment, the impedance of each of the instruments 306A-306D is substantially equal to one another. As a result, the effects of edge rate degradation on the determination of a common time reference can be eliminated at least in part due to the linear relationship between degradation and distance around the time reference bus 302 that results from the equal distribution of equal impedances on the time reference bus 302.

Also, as described here, the location of the connection points for each of a plurality of elements should be considered to equally distribute the load around the time reference bus. That is, if all of the instruments, 306A-306D are connected to a first half of the time reference bus 302 (e.g., the half closest to the third time reference output 320) a linear distribution of impedance may not be achieved. Thus, in one embodiment, the instruments are connected in an alternating fashion to each half of the time reference bus to provide a linear distribution of load as illustrated in FIG. 2B. Also, "dummy" elements may be connected to the time reference bus to achieve a desired distribution of impedance.

Figure 3A:
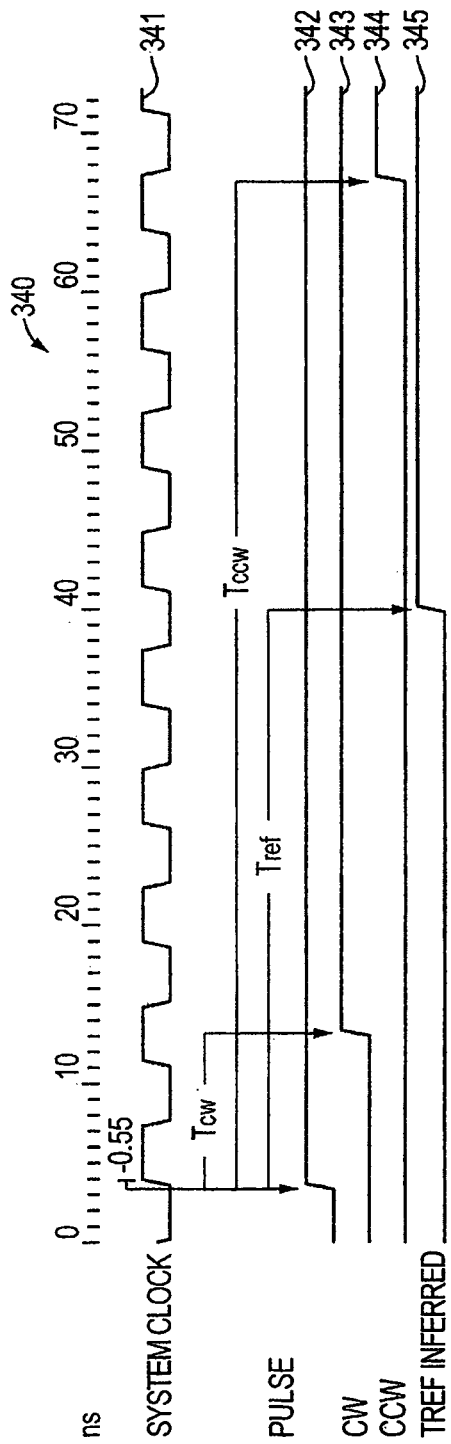
FIGS. 3A and 3B illustrate timing diagrams of signals employed in an embodiment of the invention.

FIG. 3A illustrates a timing diagram 340 concerning the generation of a time reference that can be employed throughout the system 200. The horizontal axis of the timing diagram 340 is in nanoseconds and the vertical axis (not shown) is relative voltage levels of the signals illustrated. In one embodiment, the voltages range from 0 volts to 5 volts. The illustrated signals include a system clock signal 341, a time reference generator signal 342, a time reference signal 343 corresponding to a clockwise ("CW") pulse, a time reference signal 344 corresponding to a counterclockwise ("CCW") pulse and an inferred time reference signal 345. For purposes of the immediately following description, the time reference signals are exemplary and are those received at a selected one of the plurality of instruments 206, e.g., the instrument 206A. As should become apparent to those of ordinary skill, the following approach can be employed to establish a time reference for any or all of the devices (synchronizer 204, instruments 206, etc.) that are connected to the time reference bus 202.

In one embodiment, the time reference generator signal 342 is a signal that launches the CW pulse and the CCW pulse at the synchronizer 204. In one embodiment, the rising edge of the time reference generator signal 342 is substantially simultaneous with the rising edge of the system clock signal 341 (e.g., the signals may be synchronized). As illustrated in FIG. 3A, the inferred time reference signal (Tref) 345 is established relative to the time reference generator signal 342, that is, relative to the launch time of the CW and CCW signals. In one embodiment, the buffers 230, 232 simultaneously receive the time reference generator signal 342 for the CW pulse and CCW pulse 344, respectively, and transmit the pulses over the time reference bus 202. Because the instrument 206A is located closer to the first time reference output 220 than the second time reference output 222, the CW pulse 343 arrives at the instrument before the CCW pulse 344 arrives. In the illustrated example, the CW pulse 343 arrives 10 nanoseconds ("nsecs") following the launch time of the time reference generator signal 342, and the CCW pulse 344 arrives 64 nsecs following the launch time of the time reference generator signal 342. Thus, the total propagation time of the time reference bus 202 is the sum of the CW propagation time and the CCW propagation time, that is, a total of 74 nsecs. The resulting time reference is the average propagation time (i.e., 37 nsecs) with respect to the launch time (i.e., the rising edge of the time reference generator signal 342). The inferred time reference signal 345 is included for reference. In general, the signal 345 is not actually generated by the system 200, however, because it is mathematically determined by the TMUs (e.g., the synchronizer TMU 108 and the instrument TMU 112) from the transit times of the CW and CCW signals on the time reference bus 202.

Further, the CW and the CCW signals need not be simultaneously transmitted on the time reference bus because any difference in launch time will be seen at all the instruments 206.

In accordance with one embodiment, the synchronizer 204 and the plurality of instruments 206 include software that coordinates the measurements performed by the TMU 108, 112. In a version of this embodiment, the software keeps track of whether a TMU has just received the CW pulse or the CCW pulse.

In various embodiments, the above-described time reference can be independently determined at each of the plurality of instruments 206. Further, in one embodiment, the calculated time reference (e.g., 37 nsecs) is the same for each device connected to the time reference bus 202. Where the propagation speed of the bus 202 is independent of the direction of propagation, the preceding is true regardless of the location of the device on the time reference bus 202.

Figure 3B:
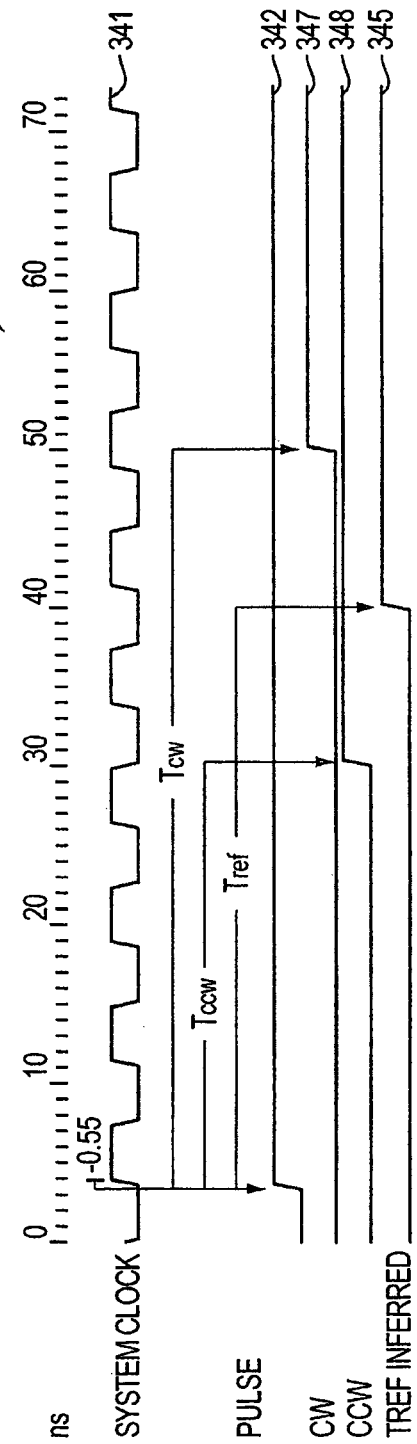

Referring to FIG. 3B, a timing diagram 346 is illustrated for a second instrument 206B selected from among the plurality of instruments 206. The timing diagram 346 includes the system clock signal 341, the time reference generator signal 342, a time reference signal 347 corresponding to a clockwise ("CW") pulse as received at the instrument 206B, a time reference signal 348 corresponding to a counterclockwise ("CCW") pulse as received at the instrument 206B and the inferred time reference signal 345. Because the second instrument 206B is located along the time reference bus 202 at a point that is closer to the second time reference output 222 than it is to the first time reference output 220, the CCW pulse 348 is received at the instrument 206B prior to receipt of the CW pulse 347. In this example, the CCW pulse 348 arrives 27 nsecs following the launch time of the time reference generator signal 342, and the CW pulse 347 arrives 47 nsecs following the launch time of the time reference generator signal 342. Thus, as expected for a time reference bus where the propagation delay is independent of the direction which a signal is transmitted, the total propagation time of the time reference bus 202 is also a total of 74 nsecs at the instrument 206B. The resulting time reference 345 is the launch time of the time reference generator signal 342 plus the average propagation time, i.e., 37 nsecs, which as expected from the preceding, equals the average propagation time determined for the instrument 206A.

The utility of the time reference results, in part, because its uniformity across the plurality of instruments 206 allows it to be employed to provide a uniform reference from which the timing of events may be determined. Further, unlike many prior approaches, it is not necessary to insure that a timing reference (e.g., a system clock) arrives at the same time at each of a plurality of instruments. In accordance with one embodiment, the synchronizer TMU 108 and the instruments TMU 112 are employed to measure events relative to the time reference. This approach can be employed in various embodiments to both provide a time reference from which the timing of events may be determined on a single instrument and to coordinate the timing of events on a plurality of instruments. In accordance with one embodiment, the TMUs 108 and 112 employ the system clock (i.e., the clock cycles) to provide a unit of measure of events relative to the time reference (e.g., the inferred time reference 345). In one embodiment, the TMUs 108 and 112 are adapted to count clock cycles and interpolate for periods between the complete cycles.

Figure 4:
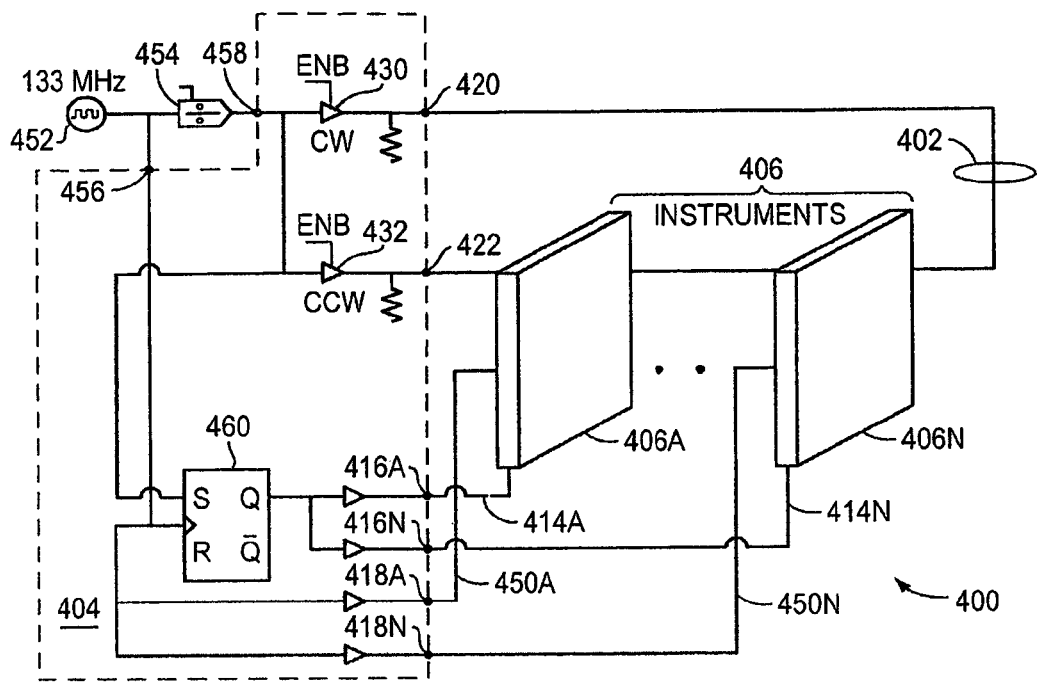
FIG. 4 illustrates a schematic diagram of a system that includes a time reference bus in accordance with a further embodiment of the invention.

Referring now to FIG. 4, an embodiment of a system 400 is illustrated that includes a synchronizer 404, a plurality of instruments 406, a time reference bus 402, a separate trigger bus connected to each one of the instruments (for example, the trigger busses 414A and 414N associated with the instruments 406A and 406N, respectively), and a separate system clock bus connected to each one of the instruments (for example, the clock busses 450A and 450B associated with the instruments 406A and 406N, respectively). Further, in one embodiment, the system 400 includes a system clock 452 and a time reference signal generator 454. According to this embodiment, the synchronizer 404 may include a separate trigger output connected to each one of the instruments (for example, the trigger outputs 416A, 416N associated with the instruments 406A and 406N, respectively), a separate clock output connected to each one of the instruments (for example, the clock outputs 418A, 418N associated with the instruments 406A and 406N, respectively), a first time reference output 420 connected to a first end of the time reference bus 402, a second time reference output 422 connected to a second end of the time reference bus 402, a system clock input 456 connected to the system clock 452 and a time reference input 458 connected to the time reference signal generator 454.

In accordance with a further embodiment, the synchronizer 404 includes a first buffer 430 with an input connected to the time reference input 458 and an output connected to the first time reference output 420, a second buffer 432 with an input connected to the time reference input 458 and an output connected to the second time reference output 422. The synchronizer 404 may also include a trigger signal generator 460.

The system clock 452 may be a programmable clock that can operate at a nominal frequency (e.g., 133 MHz) but which may also be programmed to other frequencies. In one embodiment, the system clock can be programmed to any frequency within +10% of the nominal clock frequency. As a result, a programmable clock can provide a range of adjustment that may allow a more precise frequency selection to reduce jitter or interference. In one embodiment, the system clock 452 is a low-jitter clock, for example, a clock that includes a quartz oscillator. Further, in some embodiments, all or a portion of the system clock 452 (e.g., system clock circuitry) is included in the synchronizer 404. In some further embodiments, all or a portion of the time reference signal generator 454 (e.g., signal generator circuitry) is included in the synchronizer 404.

Referring again to FIGS. 3A, 3B, it is apparent that the period of the time reference generator signal 342 (which establishes the period of the CW and CCW signals transmitted on the time reference bus 202) is much longer than the period of the system clock signal 341. According to one embodiment, the period is established such that the period exceeds the propagation delay of the entire time reference bus. Such an approach provides, in one embodiment, a group of associated signals (e.g., the time reference generator signal 342, the time reference signal 343, and the time reference signal 344) that are more easily identified and associated with one another when received, for example, at a TMU. The preceding results because the successive rising edges of the signals are not repeated too close to one another. That is, a first group consisting of one of each the time reference generator signal 342, the time reference signal 343, and the time reference signal 344 are distinct from the immediately preceding and the immediately subsequent rising edges of the same signals.

Thus, in one embodiment, the time reference signal generator 454 is a programmable divider that receives the system clock signal and generates an output signal by dividing the system clock to a period that is longer than the propagation delay of the entire time reference bus 402, e.g., the propagation delay from output 420 to output 422. In accordance with one embodiment, time reference signal generator 454 is programmed to produce a square wave with a period that can exceed the total propagation delay of the time reference bus 402, i.e., for a signal transmitted between the first time reference output 420 and the second time reference output 422. In one embodiment, the time reference signal generator 454 can divide by any value from 1 to 256. In one version, the time reference generator 454 is included in the synchronizer 404. While in an alternate version, the time reference generator 454 is external to the synchronizer 404 and an output of the time reference generator 454 is communicated to the synchronizer 404. According to one embodiment, the time reference bus 402 has a total length of 10 feet, the system clock has a frequency of 133 MHz, and the time reference generator 454 divides the system clock by 4 to provide a signal with the desired period.

According to one embodiment, the trigger signal generator 460 is a flip-flop adapted to generate a trigger signal that is communicated from the synchronizer 404 to the plurality of instruments. In one version, the trigger signal generator 460 is a SR flip flop that includes a clock input. In various embodiments, other devices may be employed such as a D flip flop.

In one embodiment, the time reference signal that is transmitted over the time reference bus 402 is also supplied to the input of the trigger signal generator 460, e.g., the S input. The trigger signal generator also receives the system clock signal 452 at the clock input. As a result, in one embodiment, the trigger signal generator 460 is adapted to synchronize the trigger signal output with a rising edge of the system clock.

Figure 5:
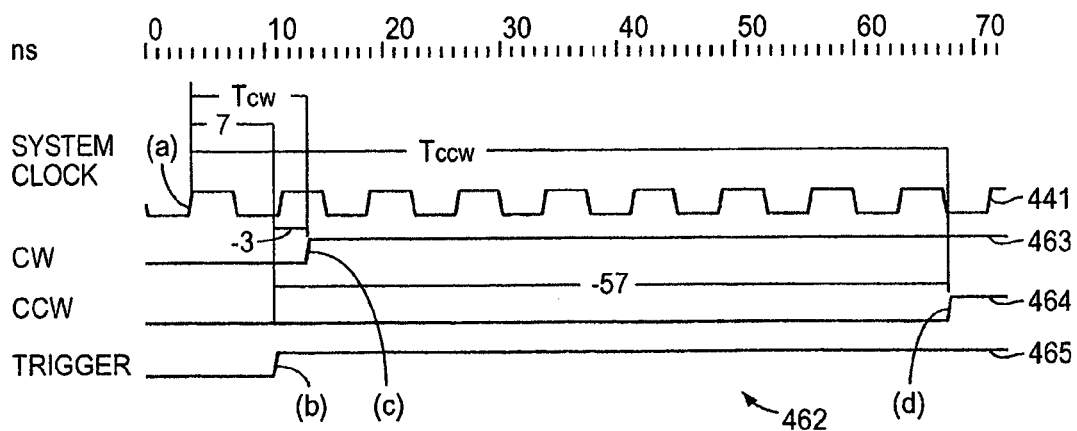
FIG. 5 illustrates a timing diagram in accordance with an embodiment of the system of FIG. 4.

In accordance with one embodiment, the same edge of the system clock signal is used to generate the trigger signal and the CW and CCW signals transmitted over the time reference bus 402. FIG. 5 illustrates a timing diagram 462 for one such embodiment. The timing diagram 462 includes a system clock signal 441 at the synchronizer, a trigger signal 465, a time reference signal for a clockwise ("CW") pulse 463 and a time reference signal for a counterclockwise ("CCW") pulse 464. As illustrated, the trigger signal 465, the time reference signal 463 and the time reference signal 464 are illustrated as received at the instrument (e.g., the instrument 406A).

In accordance with this embodiment, the edge of the system clock initiates the generation (and transmission) of the trigger signal and the CW or CCW signals. In one embodiment, the propagation delay on the trigger bus (e.g., the trigger bus 414A) is less than the propagation delay on the time reference bus 402. Thus, in FIG. 5, the trigger signal 465 arrives at a point (b) which is 7 nsecs following the launch of the trigger signal 465. Subsequently, the CW signal arrives at the instrument 10 nsecs following the launch of the trigger signal 465, at point (c), and the CCW signal arrives at the instrument 64 nsecs following the launch of the trigger signal 465, at point (d).

As described here, in one embodiment, the time reference Tref is employed but need not be determined; therefore, it is not illustrated in FIG. 5. Instead, the average arrival time of the trigger relative to the CW and CCW signals is measured to determine the arrival time of the trigger signal at the instrument relative to the time reference Tref. In this particular example, the time at point (b) less the time at point (c) is −3 nsecs. Further, the time at point (b) less the time at point (d) is −57 nsecs. The resulting average arrival time of the trigger signal 465 relative to the time reference (Tref) is −30 nsecs.

The preceding approach may be applied in a similar manner by any of the plurality of instruments 406 to determine (i.e., measure) the time of any event relative to the time reference. Further, once the time of an initial event is measured relative to the time reference, Tref, that time may be employed as a time reference from which subsequent events may be measured at the instrument or generated at the instrument. Because the time reference is the same for each instrument, the measurement of subsequent events at each instrument can be calibrated relative to a time reference available to any other instrument in the preceding manner. Also, each of the subsequent time measurements may also serve as a time reference relative to the Tref, i.e., the subsequent time measurement can provide a time reference that is known relative to the Tref and transferable to subsequent measurements and instrument-generated events.

In general, the event need not be a trigger signal and an occurrence of any event capable of being detected by the system may be referenced to a time reference common to a plurality of system elements. Accordingly, the preceding and embodiments of other approaches described herein may be employed regardless of whether events are detected by electronic or other means.

Referring again to FIG. 1, in accordance with one embodiment, the synchronizer TMU 104 and the instrument TMU 112 can perform the above-described time measurements in the system 100. In one embodiment, each TMU 108, 112 includes at least 4 inputs; a Start Arm, a Stop Arm, a Start Trigger and a Stop Trigger. In various embodiments, the TMU can measure both positive and negative time intervals. For example, if a signal is supplied to a "stop" input before being supplied to a corresponding "start" input the result is a negative interval.

In general, embodiments of the invention allow a plurality of system elements to determine their respective trigger bus delays. The overall operation of the system 100 of FIG. 1 will now be described with reference to FIG. 6 which provides a timing diagram 470 according to one embodiment. The timing diagram 470 illustrates a system clock signal 472 at the synchronizer 104, a TCAL generator signal 471 provided to the input 135, a TMU start arm signal 474, a TMU start trigger 473, a Tcal signal 475 which is transmitted on the time reference bus 102, a Tcal signal 476 transmitted in the clockwise direction on the time reference bus as received by the synchronizer TMU 108, a Tcal signal 477 transmitted in the counterclockwise direction on the time reference bus as received by the synchronizer TMU 108, a Tcal signal 478 transmitted in the clockwise direction on the time reference bus as received by the instrument TMU 112, a Tcal signal 479 transmitted in the counterclockwise direction on the time reference bus as received by the instrument TMU 112 and a system clock signal 481 which is the system clock as received at the instrument TMU 112.

In accordance with one embodiment, a common time reference is a time measured relative to an edge of the system clock signal 472 that launches the wave that propagates down the time reference bus 102. For example, as illustrated in FIG. 6, the common time reference is measured relative to the edge of the system clock signal occurring at point (a), i.e., the TMU Start Arm signal 473 is synchronized with the system clock signal 472.

Figure 6:
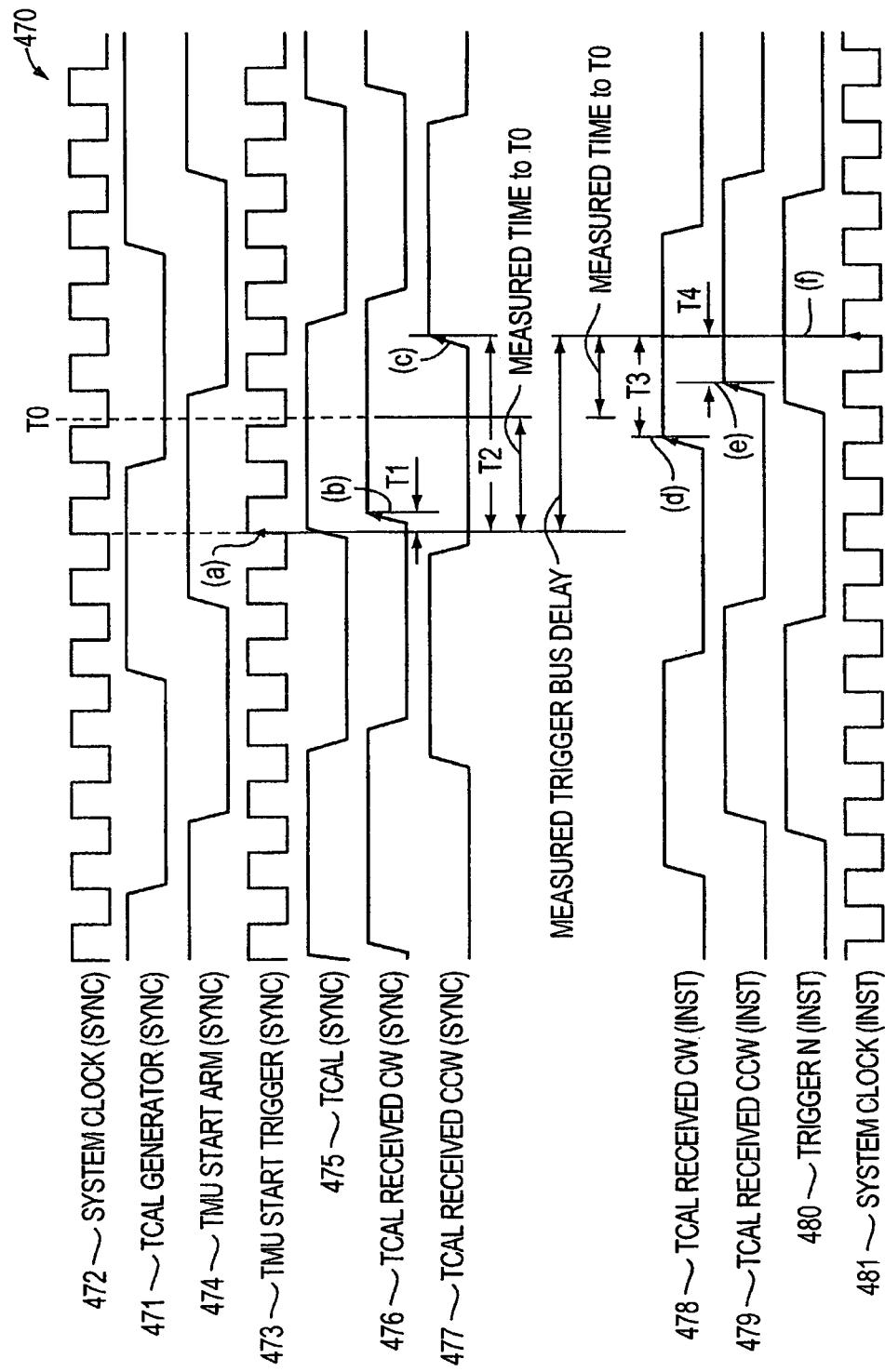
FIG. 6 illustrates a timing diagram in accordance with an embodiment of the system of FIG. 1.

As described in more detail below, FIG. 6 illustrates one approach in which a time reference (e.g., the time T0) common to a plurality of system elements (e.g., the synchronizer 104, the instrument 106, etc.) is employed to determine a trigger bus delay at each of a plurality of system elements. As referred to in this example, the trigger bus delay refers to the propagation delay of signal transmitted from the synchronizer to the instrument 106 over the trigger bus, e.g., the trigger N.

In one embodiment, the trigger bus 114 includes a trigger line 113 and a system clock line 115 that have propagation delays that are substantially equal. For example, the trigger line 113 and the system clock line 115 can include cables of equal lengths to provide transmission paths of substantially equal impedance for a trigger and a system clock transmitted from the synchronizer 104 to the instrument 106. Further, the approach described herein can be employed with a plurality of additional system elements such as a plurality of additional instruments. In accordance with one embodiment, the length of the transmission path between the synchronizer and a first instrument and the length of the transmission path between the synchronizer and a second instrument are different. The approaches described herein may be employed, however, because the propagation delay for a respective instrument is determined at the respective instrument. Accordingly, each instrument may adjust the recordation and/or generation of events at the instrument so that the events are recorded and/or generated in synchronism with those that are recorded and/or generated at others of the instruments included in the plurality of instruments.

According to one embodiment, the TMU start arm signal 474 is also communicated to the Start Arm of the synchronizer TMU 108 (the TMU connections are illustrated in FIG. 1). Additional input signals to the synchronizer TMU 108 may include a connection of the system clock signal 472 to the Start Trigger input and the connection of the time reference bus (e.g., connection of the Tcal signal transmitted CW or CCW over the time reference bus 102) to the Stop Arm input and the Stop Trigger input. In a further embodiment, the input signals connected to the instrument TMU 112 may include a connection of the time reference bus to the Start Arm and the Start Trigger, a connection of the trigger bus 114 to the Stop Arm, and a connection of the system clock signal to the Stop Trigger.

Further, the buffers 130 and 132 may be enabled to communicate the Tcal signal to the time reference bus 102 in the clockwise and counterclockwise directions, respectively. In some embodiments, the time reference bus 102 is a bi-directional bus and the drivers that are employed to generate the Tcal signals that are transmitted over the time reference bus 102 operate in a manner in which the operation of a driver at the clockwise end of the bus does not interfere with the operation of a driver at the counterclockwise end of the bus and vise versa. These features are described in greater detail below.

In one embodiment, the TMU start arm signal 474 is generated by the first flip flop 119 from the system clock signal 472 and the Tcal generator signal 471. The point (a) of the timing diagram 470 illustrates a point in time at which the Tcal signal 475 changes state to a logic HI as a result of the TMU start arm signal 474 transitioning to a logic HI with the TMU start trigger 473 state already a logic HI.

In accordance with one embodiment, the output of the first flip flop 119, i.e., the TMU start arm 474, is communicated to the input of the second flip flop 121 where the TMU start arm is re-clocked by the system clock signal 472 to generate the time reference signal (i.e., the Tcal signal 475). As a result of the re-clocking at the second flip flop 121, the Tcal signal 475 changes state to a logic HI signal at the rising edge of the system clock. The Tcal signal 475 is transmitted in the clockwise or counterclockwise direction on the time reference bus 102 depending on the state of a Tcal direction signal that is supplied to the buffers 130 and 132.

Accordingly, in this embodiment, the Tcal signal 475 transitions to a logic HI when the system clock 472 transitions high as indicated at point (a). Further, as illustrated, the TMU start trigger signal 473 is the system clock signal 472 supplied to the Start Trigger input of the synchronizer TMU 108.

In operation, the synchronizer TMU 108 determines a first time interval T1 as the amount of time between the launch of the Tcal signal in the clockwise direction on the time reference bus 102 (e.g., by the receipt of the TMU Start Arm signal pulse at the Start Arm input) and the receipt of the Tcal signal that was transmitted in the clockwise direction (e.g., receipt at the Stop Arm input). That is, between the times indicated by point (a) and point (b) in the timing diagram. In a similar fashion, the synchronizer TMU 108 determines a second time interval T2 as the amount of time between the launch of the Tcal signal in the counterclockwise direction and the receipt of the Tcal signal that was transmitted in the counterclockwise direction. That is, between the times indicated by point (a) and point (c) in the timing diagram.

For ease of reference, the timing diagram 470 illustrates a measurement of the time intervals T1 and T2 from the same clock edge. However, in practice, the interval T1 associated with the clockwise pulse is measured from a first time and the interval T2 associated with the counterclockwise pulse is measured from a second time that differs from the first time (e.g., different rising edges of the clock signal).

A common time reference T0 (e.g., a system-wide time reference) is established for the synchronizer as the average of the first time interval T1 and the second time interval T2. In accordance with one embodiment, the common time reference T0 is also established in a similar manner for each of a plurality of additional system elements which are connected to the time reference bus 102, for example, the instrument 106. Accordingly, the common time reference is established by referring to two signals. This is in contrast to many prior approaches that attempted to maintain a single signal in synchronism at a plurality of disparate system elements.

The instrument TMU 112 also measures the arrival times of the Tcal signal 475 transmitted over the time reference bus 102 to determine the common time reference T0. In accordance with one embodiment, the timing diagram 470 illustrates a Tcal signal 478 transmitted in the clockwise direction as received at point (d) by the instrument TMU 112 and a Tcal signal 479 transmitted in the counterclockwise direction as received at point (e) by the instrument TMU 112.

In addition, the instrument TMU 106 receives the system clock signal 481 at the Stop Trigger input. The system clock signal is subject to a propagation delay that is due at least in part to the transmission of the system clock from the synchronizer 104 to the instrument 106 over the trigger bus 114 (e.g., over the system clock line 115). Accordingly, the rising edge that is relevant to the measurements in this example is identified as point (f) of the system clock signal 481. As is seen from this example, the system clock signal 481 received at the instrument 106 is delayed in time relative to the system clock signal 472 at the synchronizer 104. Because each of the rising edge of the system clock at point (a) and the rising edge at point (f) correspond to one another, the rising edge at point (f) is employed by the instrument TMU 112 to determine the common time reference T0.

In the illustrated embodiment, the output of the first MUX 125 is clocked by the third flip flop 127 and supplied to the second MUX 129 whose output supplies a trigger signal to at least one of the selected trigger lines (e.g., the trigger bus 114). In this example, a trigger signal 480 is communicated over the trigger bus 114 from the synchronizer 104 to the instrument TMU 112.

The ability to determine a common time reference at each instrument allows each instrument to independently adjust the measurement and generation of signals corresponding to events to a time standard that can be used system wide. In accordance with one embodiment, this approach allows trigger signals to be distributed to each system element (e.g., instrument) without requiring that all the trigger lines to the various system elements have identical propagation delays (e.g., trigger lines of the same length). The timing diagram 470 illustrates one embodiment in which the delay of the first trigger bus is determined at a system element (e.g., the instrument 106). Because any system element connected to the time reference bus is also able to determine the common time reference, the trigger bus delay (which may have a unique value for any system element relative to others of the system elements) can be factored into time intervals measured for signals received on the trigger bus 114. Further, the trigger bus delay can also be factored into the generation-time of signals/events that are generated at the system element (e.g., the instrument 106) and transmitted on the trigger bus 114 to the synchronizer and/or other system elements.

In an alternate embodiment, the synchronizer (rather than the instrument) can compensate for the delays resulting from the propagation delay of the trigger bus. That is, the synchronizer may adjust either or both of the launch time of signals to various instruments and the recorded time of receipt of signals received from various instruments to compensate for the trigger bus delay. As one example, a synchronized event trigger may be launched from the synchronizer to a first instrument over the trigger bus of the first instrument 10 nsecs before the launch of the same synchronized event trigger launched over a second trigger bus to a second instrument. This example may be employed where the trigger bus delay of the trigger bus for the first instrument is 10 nsecs longer than the trigger bus delay of the trigger bus for the second instrument. In some embodiments, the two preceding approaches are used in combination, for example, instruments may compensate some event generation and/or measurement for their trigger bus delay while the synchronizer compensates for others of the selected event generation and/or measurements for the trigger bus delays to the various instruments.

In accordance with one embodiment, the trigger bus delay is determined as the sum of the time interval between the launch of a trigger signal and the common time reference T0 (as is determined by the synchronizer 104) and the time interval between the common time reference T0 and the receipt of the trigger signal at the instrument (as is determined by the instrument 106).

Referring to the timing diagram 470, in accordance with one embodiment, a first time interval T3 is determined as the period from the arrival of the Tcal signal 478 transmitted in the clockwise direction as received at point (d) by the instrument TMU 112 to the arrival system clock signal 481 at the instrument TMU 112 at point (f). A second time interval T4 is determined as the period from the arrival of the Tcal signal 479 transmitted in the counterclockwise direction as received at point (e) by the instrument TMU 112 and the arrival system clock signal 481 at the instrument TMU 112 at point (f). Here too, for ease of reference, the timing diagram 470 illustrates a measurement of the two time intervals T3 and T4 from the same clock edge. In practice multiple periods of the clockwise signal (e.g., the Tcal signal 478) may be transmitted on the time reference bus for a duration that is sufficient to perform any required processing. In this embodiment, the first time interval T3 is determined from the Tcal signal 478. Subsequently, multiple periods of the counterclockwise signal (e.g., the Tcal signal 479) may be transmitted on the time reference bus and the second time interval T4 determined. As will be recognized by those of skill in the art, the order of transmission may vary (i.e., a signal may be transmitted clockwise followed by a signal transmitted counterclockwise over the time reference bus or vice versa).

In accordance with one embodiment, the instrument 106 determines that the point (f) represents the rising clock edge from which the intervals are determined based on the relationship of the rising clock edge (f) to the trigger signal. In the illustrated embodiment, the clock edge at point (f) is the first rising clock edge received with the trigger signal HI during that period of the trigger signal.

The instrument determines the measured time to the common time reference T0 as the average of the time intervals T3 and T4, i.e., (T3+T4)/2. As mentioned above, the common time reference can be employed to determine the trigger bus delay to the instruments as the difference between the average of the time intervals T1 and T2 and the average of the time intervals T3 and T4 (i.e., (T1+T2)/2) less (T3+T4)/2). That is, the trigger bus delay to the instruments is determined as the time interval from the launch time of the trigger signal (e.g., point (a)) to the arrival of the trigger signal at the instrument (e.g., point (f). In the illustrated embodiment, the interval T1=[t (at point (b))–t (at point (a))]; the interval T2=[t (at point (c))–t (at point (a))]; the interval T3=[t (at point (d))–t (at point (f))]; and the interval T4=[t (at point (e))–t (at point (f))]. Thus, in this embodiment, the time intervals T3 and T4 are negative values. However, the same approach can be used where either or both of the time intervals T3 and T4 is a positive value.

Figure 7:
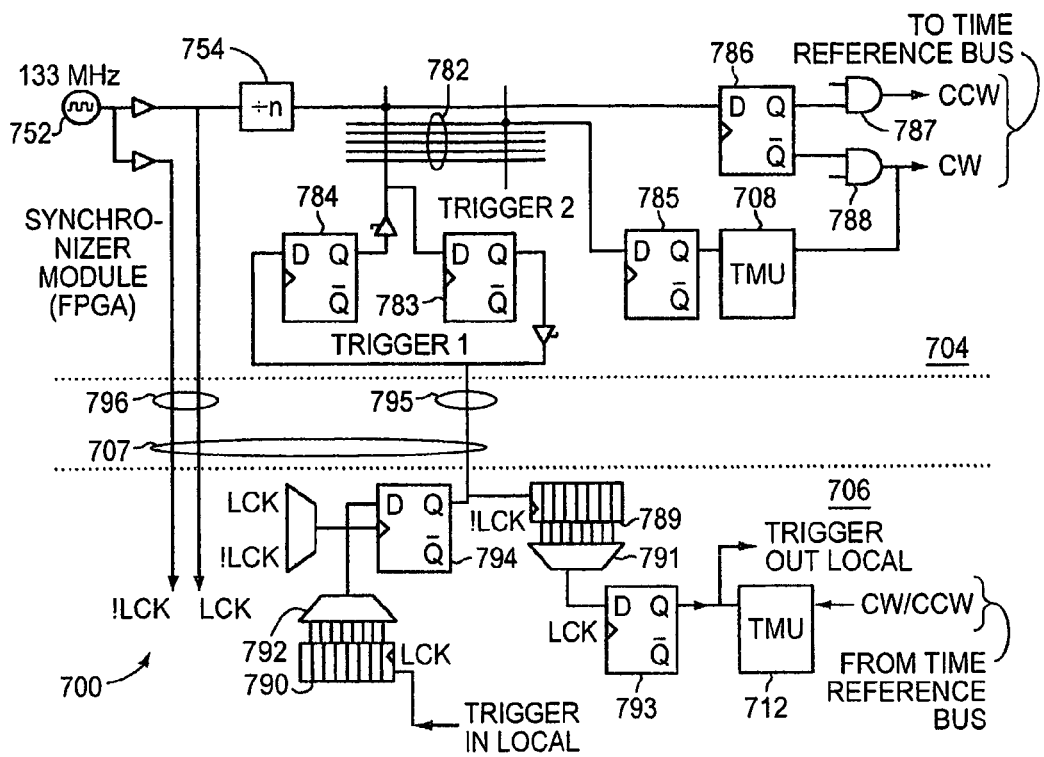
FIG. 7 illustrates a schematic diagram of a system that includes a time reference bus in accordance with yet another embodiment.

Referring now to FIG. 7, further details of a system 700 that can be employed in a synchronous operating mode are illustrated in accordance with one embodiment. The system includes a synchronizer module 704 and an instrument 706 that are employed with a time reference bus. In one embodiment, the synchronizer 704 and the instrument 706 are connected by a cable interface 707. According to one embodiment, the cable interface is a standard ribbon cable. As should be apparent to those of ordinary skill in the art, however, other types of cables, and other types of transmission mediums (e.g., electrical conductors, optical conductors, etc.) may be employed provided that they are suitable for transmitting signals between the synchronizer 704 and the instrument 706.

In one embodiment, the synchronizer module 704 includes a system clock 752, a time reference generator 754 (e.g., a divider), signal lines 782, a first flip flop 783, a second flip flop 784, a third flip flop 785, a fourth flip flop 786, a synchronizer TMU 708, a first AND gate 787 and a second AND gate 788. In one embodiment, the instrument 706 includes a first shift register 789, a second shift register 790, a first MUX 791, a second MUX 792, a first flip flop 793, a second flip flop 794 and an instrument TMU 712. In accordance with one embodiment, the cable interface 707 includes a trigger bus 795 that connects the instrument 706 to the synchronizer 704. Further, in one embodiment, the synchronizer module 704 includes a plurality of cross point switches that are employed to connect the signal lines 782 to the trigger bus 795. In accordance with one embodiment, the cable interface can also include a plurality of clock signal lines 796 (e.g., for transmission of both LCk and !LCk signals).

In general, the system 700 measures the propagation delay of the trigger bus 795 and adjusts the transmission and arrival times of the triggers to achieve a synchronous operation of the instruments in the system 700, e.g., synchronous with a specific edge of the system clock signal. In various embodiments, the system 700 includes a plurality of system elements (e.g., instruments 706) that are each connected to the synchronizer module 704 via separate trigger busses. Further, each of the separate busses (e.g., the trigger bus 795) may include a plurality of trigger lines. In the interest of clarity, trigger line 1 is the only trigger line that is shown included in the cable interface 707, however, it should be apparent that each of the remaining trigger lines (line 2, etc.) associated with the instrument 706 may also be included in the interface. In accordance with one embodiment, the cable interface to any single instrument includes 8 trigger lines.

Further, in embodiments where the system 700 includes a plurality of instruments, a separate cable interface 707 may be employed to connect each instrument to the synchronizer module 704 and each of the plurality of cable interfaces may include a trigger bus and one or more system clock lines. According to one embodiment, the length of each of the conductors in the cable interface 707 is substantially equal to provide a substantially equal propagation delay on each line of the trigger bus included in the cable interface 707. Because the system 700 can individually compensate for propagation delays to each of a plurality of instruments included in the system 700, however, the length of the cable interfaces may differ from instrument to instrument.

To operate the system 700 in a synchronous operating mode, the system can measure the propagation delay of each of the trigger busses and then adjust the transmission and arrival times of the trigger signals on the instruments that will use them in the synchronous operating mode. In accordance with one embodiment, the preceding approach insures that signal communication from instrument to instrument (e.g., board to board within a test head) is synchronous regardless of the location of the instruments within the system 700. That is, the system allows each instrument to compensate for the different propagation delays created by the differences in distance between the instrument that transmits a signal and each of the instruments that receive and process the signal.

In accordance with one embodiment, the trigger signals are routed through the synchronizer module 704 when they are transmitted from a first instrument to a second instrument. The synchronizer TMU 708 can be employed to measure the launch time of the trigger with respect to the inferred time reference (e.g., the time reference T0) where the inferred time reference is determined using the time reference bus as previously described. The instrument TMU 712 can be employed to measure the arrival time of the trigger signal relative to the time reference and determine the total propagation delay (actual) in the manner described above with reference to FIG. 5.

In one embodiment, the launch times are controlled in the synchronizer module 704 with a single phase of the system clock. Thus, in one embodiment, the measurement of the launch times need only be performed once and can be included in the calibration procedure for the synchronizer module 704.

According to one embodiment, trigger signal communication can be adjusted in the following manner. In one embodiment, the first flip flop 783 of the synchronizer module 704 is employed to receive data from a signal line at the D input and clock the output which is transmitted via the trigger line 795 to the instrument 706. Because the cable interface 707 includes both the system clock signal lines 796 and the trigger line 795, the propagation delay of the system clock signals and the data transmitted over the trigger line 795 is the same. Thus, the clock and trigger signals will be captured synchronously at the instrument 706, however, the trigger signal will have some unknown delay relative to its launch time where the delay corresponds to one or more clock cycles. The preceding information may then be used by the instrument to adjust the propagation delay of the trigger signal to a desired propagation delay with the first shift register 789. According to one embodiment, the first and second shift registers 789 and 790 are programmable shift registers. In a version of this embodiment, the desired propagation delay is greater than the actual propagation delay of any of the instruments included in the system 700.

To insure that triggers arrive in proper phase with the system clock a phase measurement of the clock can be made and a phase shift can be applied by the instrument if required. A variety of approaches well known by those of skill in the art can be employed to adjust the phase of the trigger. For example, when the correct phasing is determined a clock signal (e.g., !LCk and LCk) can be selected for use in re-clocking the transmitted trigger signal to match the trigger signal to the correct phase of the system clock. For example, where a trigger is being transmitted from the instrument 706 to the synchronizer module 704 the synchronizer TMU 708 can be used to measure the phase of a system clock received from instrument 706 relative to the time reference (e.g., the time reference T0). According to one embodiment, the system clock is transmitted both CW and CCW across the time reference bus (without dividing the system clock to create a longer period). A phase measurement is made for each of the CW and CCW signals and an average of the two measurements is determined to provide a relative phase measurement at the synchronizer module 704.

Figure 8:
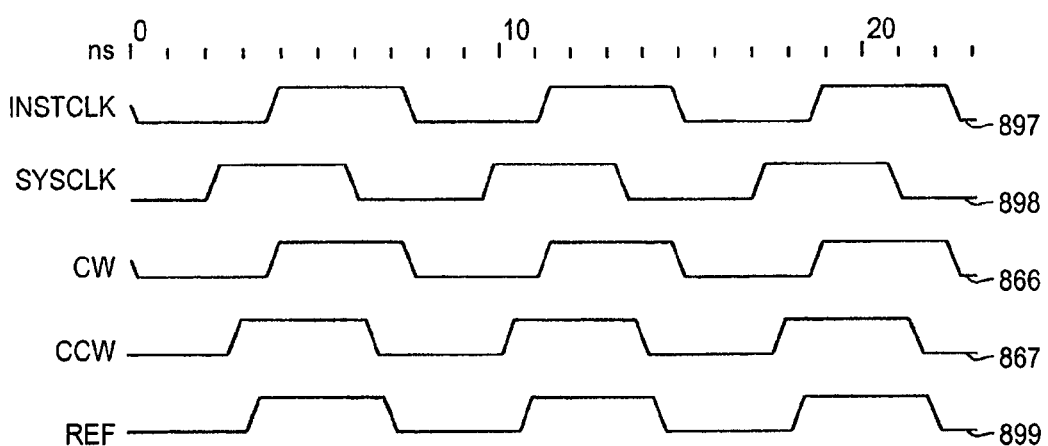
FIG. 8 illustrates a timing diagram in accordance with an embodiment of the system of FIG. 7.

Referring to FIG. 8, a timing diagram is illustrated which includes a clock signal 897 as received at the instrument, a clock signal 898 as received at the synchronizer module 704, a clock signal 866 as received at the synchronizer module 704 after being transmitted CW over the time reference bus, a clock signal 867 as received at synchronizer module 704 after being transmitted CCW over the time reference bus, and an inferred time reference signal 899.

The instrument TMU 712 can be used to measure the phase of the CW and CCW clock signals and provide a relative phase measurement at the instrument. This information is employed to determine which clock phase to use when a trigger signal is transmitted from the instrument 706 to the synchronizer module 704. According to one embodiment, once the correct phase is determined, the instrument 706 can employ the second flip flop 794 to re-clock the trigger signal before transmitting the clock signal to the synchronizer module 704. In another embodiment, the second flip flop 794 is replaced with a programmable phase shifter that allows for a variable delay to be added to the trigger signal.

Because the clock signal experiences the same phase shift when transmitted in both directions (i.e., from synchronizer to instrument and when transmitted from instrument to synchronizer), the second flip flop 784 is employed by the synchronizer 704 to re-clock the trigger signal received from the instrument 706. In one embodiment, the phase shift of the trigger signal can be adjusted in 90 degree increments to insure that setup and hold times are met at the receiver.

In accordance with one embodiment, the propagation time of the trigger signal from the instrument 706 to the synchronizer module 704 can be measured once the correct phase is determined. In a further embodiment, the desired propagation delay can be achieved by adjusting the propagation delay of the transmitted trigger signal using the second shift register 790.

According to one embodiment, the propagation time is measured by transmitting a trigger signal from the synchronizer module 704 to the instrument 706 via a first trigger line. The transmitted trigger signal is then re-transmitted back to the synchronizer module 704 via a second trigger line. The instrument 706 to synchronizer 704 delay is determined by subtracting the phase-adjusted synchronizer to instrument delay from the total round trip delay of the trigger signal. The second shift register 790 can be set (e.g., programmed) to the desired value based on the preceding measurement. According to one embodiment, the measurement of the instrument 706 to synchronizer module 704 delay is made on the synchronizer module 704. In another embodiment, however, the measurement is made on the instrument 706.

The preceding approach described with reference to FIGS. 7 and 8 may be employed for each of the instruments that are included in the system 700 and connected to the synchronizer module 704.

Figure 9:
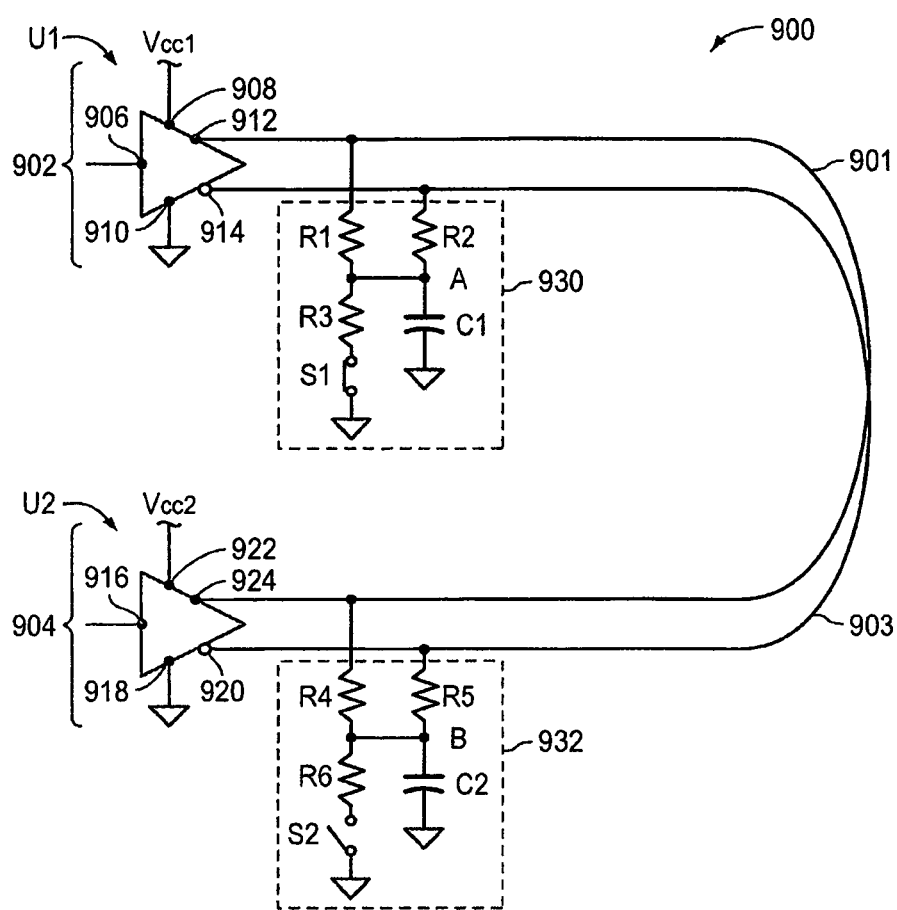
FIG. 9 illustrates a schematic diagram of a time reference bus in accordance with one embodiment.

Referring now to FIG. 9, a bi-directional bus 900 (e.g., a time reference bus) is illustrated in accordance with one embodiment. The bi-directional bus 900 can be employed in a system as a time reference loop for a plurality of system elements that are connected to the bus 900. In general, in accordance with one embodiment, the bi-directional bus 900 is designed to operate in a manner in which operation of the driver at the first end does not interfere with operation of the driver at the second end. Further, in various embodiments, the bus 900 has a propagation delay that is substantially similar in each of a first direction and a second direction that is opposite the first direction. For reference, the bi-directional bus 900 is described using clockwise (CW) as a first direction and counterclockwise (CCW) as a second direction that is opposite the first direction.

In the illustrated embodiment, the bi-directional bus 900 includes a first end 902 with a first driver U1 and a second end 904 with a second driver U2. In one embodiment, the bi-directional bus is a differential bus that includes a first line 901 and a second line 902. The first driver U1 includes a terminal 906 connected to a signal source, a terminal 908 connected to a voltage source (e.g., the voltage source Vcc1), a terminal 910 connected to ground, a non-inverting terminal 912 connected to the first line 901 of the bi-directional bus 900 and an inverting terminal 914 connected to the second line 903 of the bi-directional bus 900.

According to a further embodiment, the first end 902 also includes circuitry 930 including a first resistor R1, a second resistor R2, a third resistor R3, a capacitor C1 and a switch S1. In the illustrated embodiment, a first terminal of the first resistor R1 is connected to the first line 901, a second terminal of the first resistor R1 is connected to a first terminal of the third resistor R3, a second terminal of the third resistor R3 is connected to a first terminal of the switch S1 and a second terminal of the switch S1 is connected to ground. Further, a first terminal of the second resistor R2 is connected to the second line 903, a second terminal of the second resistor R2 is connected to a first terminal of the capacitor C1 and a second terminal of the capacitor C1 is connected to ground. In addition, the second terminal of the first resistor R1, the second terminal of the second resistor R2, the first terminal of the third resistor R3 and the first terminal of the capacitor C1 are all connected to one another, i.e., at the point A.

In a further embodiment, the second driver U2 includes a terminal 916 connected to a signal source, a terminal 922 connected to a voltage source (e.g., the voltage source Vcc2), a terminal 918 connected to ground, a non-inverting terminal 924 connected to the first line 901 of the bi-directional bus 900 and an inverting terminal 920 connected to the second line 903 of the bi-directional bus 900.

According to a further embodiment, the second end 904 also includes circuitry 932 including a first resistor R4, a second resistor R5, a third resistor R6, a capacitor C2 and a switch S2. In the illustrated embodiment, a first terminal of the first resistor R4 is connected to the first line 901, a second terminal of the first resistor R4 is connected to a first terminal of the third resistor R6, a second terminal of the third resistor R6 is connected to a first terminal of the switch S2 and a second terminal of the switch S2 is connected to ground. Further, a first terminal of the second resistor R5 is connected to the second line 903, a second terminal of the second resistor R5 is connected to a first terminal of the capacitor C2 and a second terminal of the capacitor C2 is connected to ground. In addition, the second terminal of the first resistor R4, the second terminal of the second resistor R5, the first terminal of the third resistor R6 and the first terminal of the capacitor C2 are all connected to one another, i.e., at the point B.

In various embodiments, the bi-directional bus 900 is configured such that the first driver U1 and the second driver U2 can operate without interfering with one another. In a further embodiment, the first end 902 and the second end 904 are terminated such that pulses transmitted on the bus 900 are not reflected from the receiving end of the bus.

More specifically, in one embodiment, the receiving end of the bi-directional bus 900 is controlled to turn off the outputs of the driver located at the receiving end. For example, where a signal is transmitted from the first end 902 in a clockwise direction over the bi-directional bus 900, the voltage Vcc2 supplied to the terminal 922 can be adjusted to turn off the outputs located at the terminals 920 and 924. In one embodiment, the nominal voltage supplied to the terminal 922 is 3.3 VDC and the voltage Vcc2 is adjusted downward to 2.44 VDC at which the second driver U2 is turned off. The first driver U1 can be operated similarly to turn off the outputs at terminals 912 and 914 by adjusting the voltage Vcc1.

In addition, the circuitry 930 and 932 can be employed to provide a "pull down" resistance for each of the first driver U1 and the second driver U2, respectively, when the driver is operating. Accordingly, where the first driver U1 is employed to transmit a signal over the bi-directional bus 900 (e.g., in a clockwise direction), the circuitry 930 is configured with the switch S1 closed and the resistors R1, R2 and R3 connected to provide a "pull down" function to the first driver U1. The capacitor C1 acts to maintain the point A at a substantially constant voltage as the first driver U1 switches. Further, where the first driver U1 is operating, the circuitry 932 is configured with the switch S2 open. As a result, the resistors R4 and R5 form a parallel termination and no pull down function is provided at the second end 904. The parallel termination provides a circuit where a pulse transmitted from the first end 902 travels to the second end 904 and stops, e.g., there is no reflection back onto the bi-directional bus 900.

Similarly, where the second driver U2 is operating to transmit a signal counterclockwise around the bi-directional bus 900, the first driver U1 is off, the switch S1 is open and the switch S2 is closed. As a result, the resistors R4, R5 and R6 are connected to provide a "pull down" function to the second driver U2. The capacitor C2 acts to maintain the point B at a substantially constant voltage as the second driver U2 switches. Further, the resistors R1 and R2 form a parallel termination and no pull down function is provided at the first end 902. In accordance with one embodiment, emitter coupled logic, in particular pseudo emitter coupled logic is employed for the first driver U1 and the second driver U2.

Various embodiments of the invention include a low jitter clock that may include a phase detector which receives an input signal from an external reference (e.g., a 10 MHz reference), and a low jitter voltage controlled oscillator whose output is divided to generate the system clock output. The clock generation circuitry may also include a feedback loop that provides feedback for frequency control to the phase detector.

Further, in one embodiment of the invention, a method is employed to establish a time reference across a plurality of instruments in a distributed system without the need to control the propagation delay of the signals used to establish the time reference. The method also includes the distribution of the system clock signal to each instrument without controlling the propagation delay. The propagation delay can be measured relative to the common time reference. Thus, in one embodiment, the instruments may use the system clock as a reference of time which has known offset to a "central" shared time reference. In one embodiment, known techniques can be employed to adjust the clock phase or delay to a specific target at an instrument that requires the adjustment.

The embodiments described herein may be employed to provide a timing calibration system for ATE. For example, embodiments of the systems described herein can provide for the synchronization of modules by measuring and adjusting measurements to a common time reference. Further, embodiments can be employed in systems that measure time intervals at a sub-microsecond level.

According to one embodiment, the plurality of system elements are proximate to one another. For example, the system elements may all be located on a single printed circuit board. Embodiments of the invention can also be employed with a plurality of system elements that are distributed including those that are separated by a substantial distance from one another, e.g., geographically distributed.

As mentioned previously, embodiments of the invention may employ one or a plurality of time reference busses, e.g., a first set of instruments connected to a first time reference bus and a second set of instruments connected to a second time reference bus. Where two or more time reference busses are employed the system can measure and adjust for any error between the busses.

As used herein, the terms clockwise and counterclockwise refer to opposite directions on the time reference bus. For example, in FIG. 4, the instrument located adjacent the first time reference output 420 may be referred to as being located at the clockwise end of the time reference bus while the instrument located adjacent the second time reference output 422 may be referred to as being located at the counterclockwise end of the time reference bus.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An automatic test system, comprising:
 a synchronizer configured to measure signals corresponding to system events relative to a time reference;
 a plurality of system elements in electrical communication with the synchronizer, wherein the plurality of system elements include a first instrument and a second instrument;
 a first trigger bus configured to couple to the synchronizer and the first instrument, the first trigger bus having a first propagation delay; and
 a second trigger bus configured to couple to the synchronizer and the second instrument, the second trigger bus having a second propagation delay that is different than the first propagation delay,
 wherein the time reference is a synchronous time reference employed by each of the first instrument and the second instrument to measure the signals at the respective instruments relative to the time reference.

2. The automatic test system of claim 1, wherein the first trigger bus includes a first signal path configured to transmit a system clock signal to the first instrument, and wherein the second trigger bus includes a second signal path to transmit the system clock signal to the second instrument.

3. The automatic test system of claim 1, further comprising a bi-directional loop coupled to each of the synchronizer, the first instrument and the second instrument, wherein the bi-directional loop is configured to transmit a plurality of signals employed by each of the synchronizer, the first instrument and the second instrument to determine the synchronous time reference.

4. The automatic test system of claim 3, wherein the bi-directional loop includes a bi-directional differential bus.

5. The automatic test system of claim 3, wherein the bi-directional loop is configured to provide a first propagation speed in a first direction and a second propagation speed in a second direction which is opposite the first direction, and wherein the first propagation speed is substantially equal to the second propagation speed.

6. The automatic test system of claim 3, wherein the bi-directional loop is a first bi-directional loop, wherein the plurality of system elements is a first plurality of system elements, wherein the plurality of signals is a first plurality of signals, and wherein the system further comprises:
 a second plurality of system elements in electrical communication with the synchronizer, wherein the plurality of system elements include a third instrument and a fourth instrument;
 a third trigger bus configured to couple to the synchronizer and the third instrument, the third trigger bus having a third propagation delay; and
 a fourth trigger bus configured to couple to the synchronizer and the fourth instrument, the fourth trigger bus having a fourth propagation delay that is different than the third propagation delay,
 a second bi-directional loop coupled to each of the synchronizer, the third instrument and the fourth instrument, wherein the second bi-directional loop is configured to transmit a second plurality of signals employed by each of the synchronizer, the third instrument and the fourth instrument to determine the synchronous time reference.

7. The automatic test system of claim 6, wherein the time reference is a first time reference, wherein a time of events measured by the first plurality of system elements is measured relative to the first time reference, wherein a time of events measured by the second plurality of system elements is measured relative to a second time reference, and wherein the time of events measured by the second plurality of system elements is adjusted to compensate for a difference between the second time reference and the first time reference.

8. The automatic test system of claim 1, wherein a length of the first trigger bus coupled to the first instrument is substantially different than a length of the second trigger bus coupled to the second instrument.

9. The automatic test system of claim 1, wherein the first instrument and the second instrument are located in a test head.

10. The automatic test system of claim 1, wherein an input impedance of the first instrument is substantially equal to an input impedance of the second instrument.

11. A method for measuring signals relative to a time reference for an automatic test system including a synchronizer in electrical communication with a plurality of system elements of the automatic test system, the method comprising acts of:
measuring, by the synchronizer, signals corresponding to system events relative to the time reference;
coupling, by a first trigger bus having a first propagation delay, the synchronizer to a first instrument of the plurality of system elements;
coupling, by a second trigger bus having a second propagation delay, the synchronizer to a second instrument of the plurality of system elements; and
measuring, by each of the first instrument and the second instrument, the signals at the respective instruments relative to the time reference, the time reference being a synchronous time reference.

12. The method of claim 11, further comprising acts of:
transmitting, by a first signal path of the first trigger bus, a system clock signal to the first instrument; and
transmitting, by a second signal path of the second trigger bus, the system clock signal to the second instrument.

13. The method of claim 11, further comprising the act of transmitting, by a bi-directional loop coupled to each of the synchronizer, the first instrument, and the second instrument, a plurality of signals employed by each of the synchronizer, the first instrument, and the second instrument to determine the synchronous time reference.

14. The method of claim 13, wherein the bi-directional loop includes a bi-directional differential bus and the act of transmitting, by the bi-directional loop, a plurality of signals includes the act of transmitting, by the bi-directional differential bus, a plurality of signals.

15. The method of claim 13, further comprising the act of providing, by the bi-directional loop, a first propagation speed in a first direction and a second propagation speed in a second direction which is opposite the first direction, the first propagation spend being substantially equal to the second propagation speed.

16. The method of claim 13, wherein the bi-directional loop is a first bi-directional loop, wherein the plurality of system elements is a first plurality of system elements, and wherein the plurality of signals is a first plurality of signals.

17. The method of claim 16, further comprising acts of:
coupling, by a third trigger bus having a third propagation delay, the synchronizer to a third instrument of a second plurality of system elements;
coupling, by a fourth trigger bus of the synchronizer having a fourth propagation delay, the synchronizer to a fourth instrument of the second plurality of system elements;
measuring, by each of the third instrument and the fourth instrument, the signals at the respective instruments relative to the time reference, the time reference being a synchronous time reference; and
transmitting, by a second bi-directional loop coupled to the synchronizer, the third instrument and the fourth instrument, a second plurality of signals employed by each of the synchronizer, the third instrument and the fourth instrument to determine the synchronous time reference.

18. The method of claim 17, wherein the time reference is a first time reference, wherein a time of events measured by the first plurality of system elements is measured relative to the first time reference, wherein a time of events measured by the second plurality of system elements is measured relative to a second time reference, and wherein the time of events measured by the second plurality of system elements is adjusted to compensate for a difference between the second time reference and the first time reference.

19. The method of claim 11, wherein a length of the first trigger bus coupled to the first instrument is substantially different than a length of the second trigger bus coupled to the second instrument.

20. The method of claim 11, wherein the first instrument and the second instrument are located in a test head.

21. The method of claim 11, wherein an input impedance of the first instrument is substantially equal to an input impedance of the second instrument.

* * * * *

UNITED STATES PATENT AND TRADEMARK OFFICE
CERTIFICATE OF CORRECTION

| | | |
|---|---|---|
| PATENT NO. | : 8,570,921 B2 | Page 1 of 1 |
| APPLICATION NO. | : 12/661175 | |
| DATED | : October 29, 2013 | |
| INVENTOR(S) | : John D. Unger et al. | |

It is certified that error appears in the above-identified patent and that said Letters Patent is hereby corrected as shown below:

In the Specification:

In column 6, line 9, "110" should be --I/O--.

Signed and Sealed this
Fourth Day of March, 2014

Michelle K. Lee
*Deputy Director of the United States Patent and Trademark Office*